(12) United States Patent
Pyner et al.

(10) Patent No.: US 6,744,398 B1
(45) Date of Patent: Jun. 1, 2004

(54) DISTANCING AND POSITIONING SYSTEMS AND METHODS

(76) Inventors: Derek J. Pyner, 7963 Garfield Dr., North Delta, B.C. (CA), V4C 4C9; Russell A. Fretenburg, 508 East 6$^{th}$ Street, North Vancouver, B.C. (CA), V7L 1R1; Steven S. J. Kazemir, 1965 Rodger Avenue, Pt. Coquitlam, B.C. (CA), V3C 1B8

( * ) Notice: Subject to any disclaimer, the term of this patent is extended or adjusted under 35 U.S.C. 154(b) by 0 days.

(21) Appl. No.: 10/420,641

(22) Filed: Apr. 21, 2003

Related U.S. Application Data

(60) Provisional application No. 60/374,231, filed on Apr. 19, 2002.

(51) Int. Cl.$^7$ ............................................... G01S 13/78
(52) U.S. Cl. ..................................................... 342/125
(58) Field of Search ................................. 342/125, 118, 342/127, 47, 50; 473/407; 367/118, 128, 127, 2, 6

(56) References Cited

U.S. PATENT DOCUMENTS

| | | | |
|---|---|---|---|
| 3,613,095 A | 10/1971 | Elwood | |
| 3,787,846 A | 1/1974 | Bishop | |
| 3,797,015 A | 3/1974 | Elwood | |

(List continued on next page.)

FOREIGN PATENT DOCUMENTS

| | | | |
|---|---|---|---|
| DE | 31 31 188 A | 2/1983 | |
| DE | 33 24 693 A | 1/1985 | |
| EP | 809118 A | 11/1997 | |
| GB | 2249448 A | 5/1992 | |
| JP | 403118494 A | 5/1991 | |
| JP | 08166444 A | 6/1996 | |
| JP | 0827162 A | 11/1996 | |
| WO | WO/00/33103 | * 6/2000 | ........... G01S/13/78 |

OTHER PUBLICATIONS

Ferraro & Boccignone, "Information proties in fine–to–course image transformations", Image Processing, 1998. ICIP 98. Proceedings. 1998 Int'l Conference on vol. 2, 1998 pp. 757–761 vol. 2.

Miller, Grenander, O'Sullivan & Snyder, "Automatic target recognition organized via jump–diffusion algorithms", Image Processing, IEEE Transactions on vol. 6 Jan. 1, 1997, pp. 157–174.

Rabideau & Steinhardt, "Fast subspace tracking using course grain and fine grain parallelism", Acoustics, Speech, and Signal Processing, 1995. ICASSP–95 1995 Int'l Conference on vol. 5 1995 pp. 3211–3214 vol. 5.

Pentland, Darrell, Turk & Huang, "A simple, real–time range camera", Computer Vision and Pattern Recognition, 1989. Proceedings CVPR '89., IEEE Computer Society Conference on 1989 pp 256–261.

*Primary Examiner*—Daniel T. Pihulic
(74) *Attorney, Agent, or Firm*—Michael R. Schacht; Schacht Law Office, Inc.

(57) ABSTRACT

A distancing system for determining a distance between first and second locations comprising mobile and fixed units. The mobile unit is arranged at the first location and comprises first receive and first transmit portions operating at respective first and second frequencies, first and second baseband processors operating based on first and second clock signals, and a first control portion. The fixed unit is arranged at the second location and comprises second receive and transmit portions operating at the respective second and first frequencies, a third baseband processor operating based on a third clock signal, a second control portion, and a mode switch. The configuration of mode switch circuit allows communication between the fixed and mobile units or a determination of the distance between first and second locations.

1 Claim, 12 Drawing Sheets

U.S. PATENT DOCUMENTS

| | | |
|---|---|---|
| 3,816,832 A | 6/1974 | Elwood |
| 3,839,719 A | 10/1974 | Elwood |
| 3,868,692 A | 2/1975 | Woodard et al. |
| 3,916,410 A | 10/1975 | Elwood |
| 4,128,835 A * | 12/1978 | Russell ........................ 342/46 |
| 4,136,394 A | 1/1979 | Jones et al. |
| 4,278,977 A | 7/1981 | Nossen |
| 4,297,701 A | 10/1981 | Henriques |
| 4,513,285 A | 4/1985 | Pike et al. |
| 4,703,444 A | 10/1987 | Storms, Jr. et al. |
| 5,044,634 A | 9/1991 | Dudley |
| 5,046,839 A | 9/1991 | Krangle |
| 5,056,106 A | 10/1991 | Wang et al. |
| 5,095,430 A | 3/1992 | Bonito et al. |
| 5,298,904 A | 3/1994 | Olich |
| 5,311,271 A | 5/1994 | Hurt et al. |
| 5,582,566 A | 12/1996 | Imasaka et al. |
| 5,652,534 A | 7/1997 | Taylor et al. |
| 5,691,922 A | 11/1997 | McEwan et al. |
| 5,912,644 A | 6/1999 | Wang |
| 6,067,039 A * | 5/2000 | Pyner et al. ................ 342/125 |

\* cited by examiner

US 6,744,398 B1

DISTANCING AND POSITIONING SYSTEMS AND METHODS

RELATED APPLICATIONS

This application claims priority of U.S. Provisional Application Serial No. 60/374,231 filed Apr. 19, 2002.

TECHNICAL FIELD

The present invention relates to systems and methods for determining the distance between two objects or relative position of an object and, more specifically, to such systems and methods that determine distance and/or position based on the time a radio signal takes to propagate from a first location to a second location.

SUMMARY OF THE INVENTION

The present invention may be embodied as a distancing system for determining a distance between first and second locations comprising mobile and fixed units. The mobile unit is arranged at the first location and comprises first receive and first transmit portions operating at respective first and second frequencies, first and second baseband processors operating based on first and second clock signals, and a first control portion. The fixed unit is arranged at the second location and comprises second receive and transmit portions operating at the respective second and first frequencies, a third baseband processor operating based on a third clock signal, a second control portion, and a mode switch. The configuration of mode switch circuit allows communication between the fixed and mobile units or a determination of the distance between first and second locations.

The present invention may also be embodied as a method of determining a distance between first and second locations. If a plurality of fixed units are used, the present invention may further be embodied as a system or method for locating the mobile unit relative to the plurality of fixed units. In addition, the present invention may be configured as a system or method for collecting data from a plurality of locations.

These and other objects of the invention will become apparent from the following detailed discussion.

DETAILED DESCRIPTION OF THE INVENTION

Figure 1:
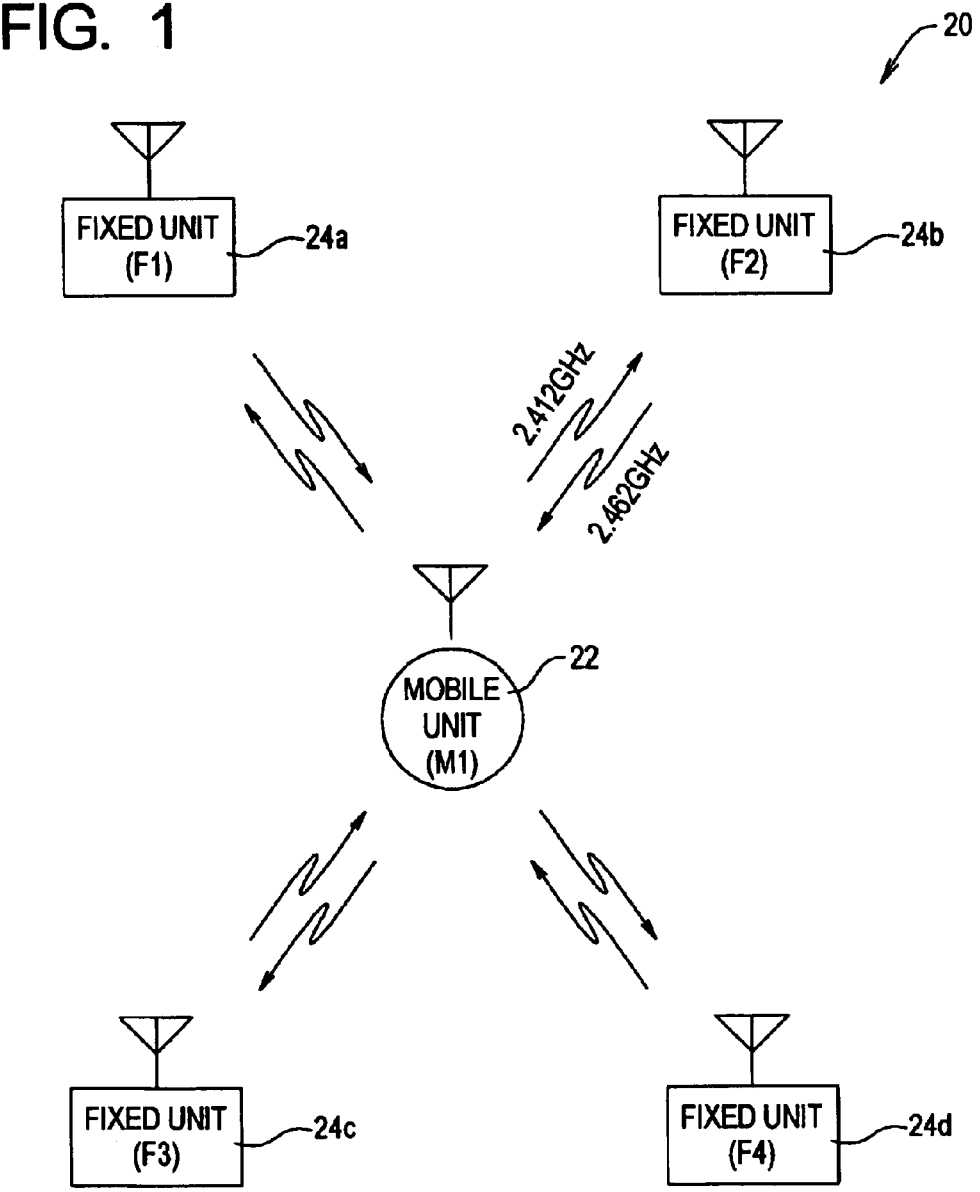
FIG. 1 is a system level block diagram showing one exemplary embodiment of a positioning system of the present invention.

Referring initially to FIG. 1 of the drawing, depicted therein as 20 is a positioning system constructed in accordance with, and embodying, the principles of the present invention. This system 20 comprises a mobile unit 22 and one or more fixed units 24.

I. Basic Operation of Positioning System

The positioning system 20 may be used to find the distance between the mobile unit 22 and any one of the fixed units 24 and/or may be used to find the location of the mobile unit 22 relative to a plurality of the fixed units 24. The positioning system 20 may be used in any environment in which precise distance and/or location information is important. Examples of environments in which the positioning system 20 may be used include construction sites, manufacturing facilities, the location of components of a utility system, location of ordinance, the tracking of vehicles or railroad cars, and facilities maintenance systems, and the like.

The basic principles of the present invention may be implemented as a distancing system using a single mobile unit 22 and a single fixed unit 24. A distancing system yields only distance data and not absolute position data. Distance data identifies a circular path about the mobile unit 22. The fixed unit 24 is located somewhere on this circular path.

In some situations, distance information alone may be sufficient to achieve a desired goal. For example, the present invention may be used on a golf course to determine the distance between the golf ball and a golf pin; in this environment, the precise location of the mobile unit 22 relative to the pin is not important. Typically, the pin will be visible to a person standing at the ball. But knowledge of the precise distance between the golf ball and the golf pin may help the golfer select an appropriate club.

However, the present invention will be described herein in the context of a positioning system that can identify the absolute position of the mobile unit on a predetermined coordinate system. When embodied as a positioning system, at least two and preferably three or more fixed units are required. In a scenario in which two fixed units are used, the calculated distance data identifies two circular paths about the fixed units 24. These circles will overlap at two locations, and the position of the mobile unit 22 can be identified as one of the two locations at which the circles intersect. In some situations, external information may be used to eliminate one of these two locations as a possibility, thereby allowing the position of the mobile unit to be determined absolutely with only two fixed units 24.

However, it is more likely that the present invention will be embodied as shown in FIG. 1, with one or more mobile units 22 and three or more fixed units 24. The use of three or more fixed units will allow the location of the mobile unit to be established with reference to a two-dimensional coordinate system and without external information. The exemplary positioning system 20 employs four fixed units 24a–d.

If desired, the location of the mobile unit 22 can be determined with reference to a three dimensional coordinate system; for a three dimension coordinate system, at least three and preferably five or more fixed units 24 will be used. Generally speaking, the greater the number of fixed units, the greater the accuracy of the distancing/positioning system incorporating the principals of the present invention.

Whether implemented as a distancing system or as a positioning system 20 as described herein, the mobile and fixed units 22 and 24 calculate distances based on radio frequency signals transmitted at two different frequencies as shown in FIG. 1. The exact frequencies are not important to the application of the present invention in its broadest form and will be determined by such factors as government allocation of the frequency spectrum and like. The exemplary system 20 employs a first frequency of 2.412 GHz and a second frequency of 2.462 GHz.

With the foregoing understanding of the basic operation of the positioning system 20, the details of construction and operation of the system 20 will now be described in further detail.

II. Measurement Cycle

Figure 2:
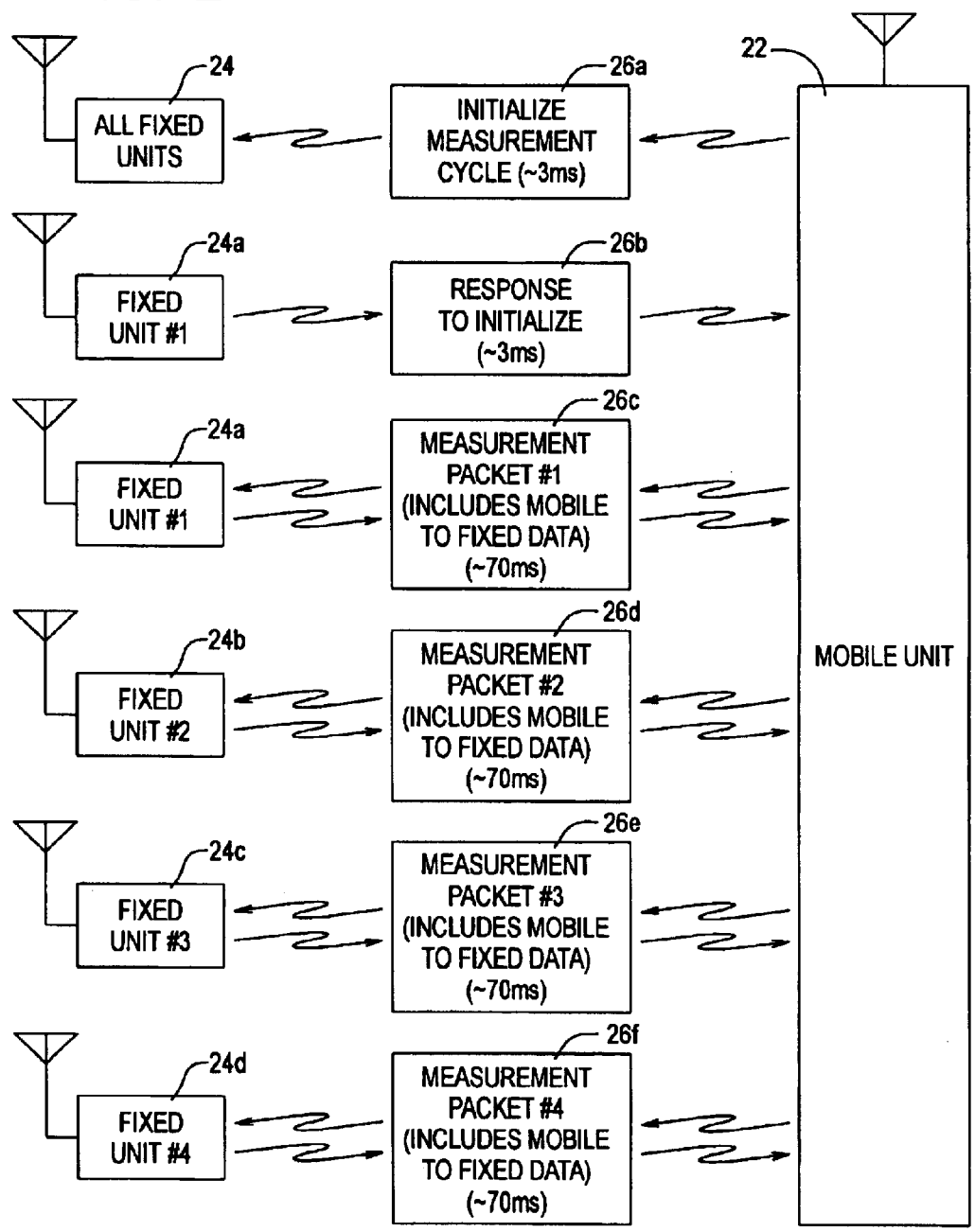
FIG. 2 is a system level block diagram illustrating the data flow employed by the positioning system of FIG. 1.

Referring now to FIG. 2, depicted therein is an exemplary measurement cycle performed by the mobile unit 22. In general, the mobile unit 22 sends information packets 26 to one or more of the fixed units 24. The system 20 uses the data contained by the information and the propagation times of these packets 26 to determine distance and, in the case of the system 20, position.

In particular, each of the data or information packets 26 comprises instructions and data in a predetermined format. The exact content and format of the data packets 26 is not important to the principles of the present invention, and these data packets 26 will not be described herein beyond what is necessary for a complete understanding of the present invention. The information packets 26 may contain data for identifying the source and destination of the packet, commands, distance or position data, and the like. Other data, such as text messages, sensor data, or the like may also be included in the packets 26 if desired under the circumstances.

Referring now back to FIG. 2, the mobile unit first sends an Initialize Measurement cycle packet 26a to all of the fixed units. As will be described in further detail below, the fixed units 24 initialize themselves in preparation for the measurement cycle, and the first fixed unit 24 sends a Response To Initialize data packet 26 to the mobile unit 22 to confirm that the Initialize Measurement cycle packet 26a was received. The system 20 may be configured such that all of the fixed units 24 send a verifying Response to Initialize data packet.

The mobile unit 22 next sends a First Measurement packet 26c containing control commands and/or data information indicating that it is intended for the first fixed unit 24a. The first fixed unit 24a receives the First Measurement packet 26c on a first frequency and retransmits this packet 26c back to the mobile unit 22 on a second frequency. The mobile unit 22 then calculates the distance between its current location and the location of the first fixed unit 24a. This process is repeated by sending Measurement Packets 26d, 26e, and 26f to each of the other exemplary fixed units 24b–d.

When the mobile unit 22 has determined the distance between its current location and the locations of three or more of the fixed units 24, the absolute location of the mobile unit 22 may be determined based on the predetermined locations of the fixed units 24. As the mobile unit 22 moves, the measurement cycle may be performed periodically or randomly to update the position of the mobile unit 22.

III. Mobile Unit

The construction and operation of the mobile unit 22 will now be described in further detail.

Figure 3:
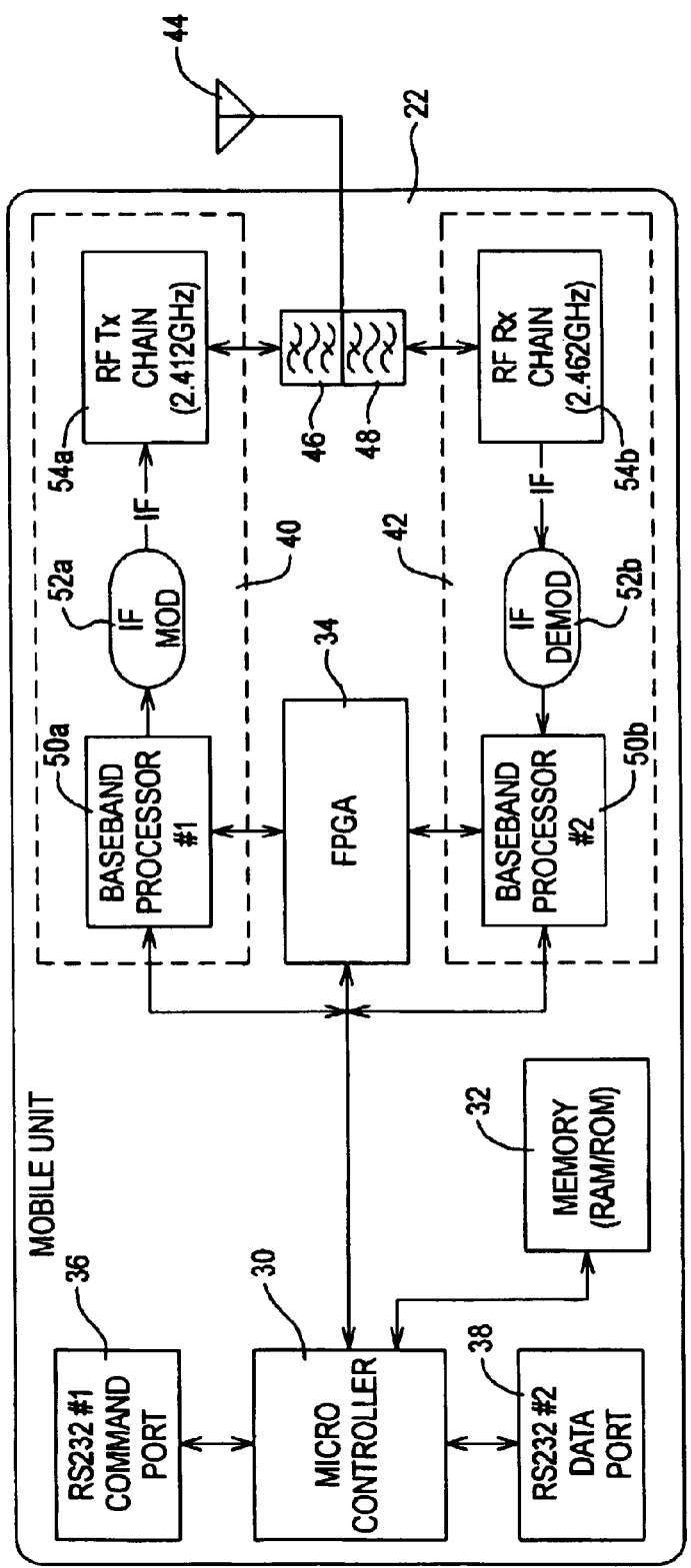
FIG. 3 is a high level block diagram depicting the overall structure of a mobile unit used by the positioning system of FIG. 1.

Referring initially to FIG. 3, depicted therein is a simplified blocked diagram of the mobile unit 22. The mobile unit 22 comprises a controller 30, memory 32, and a logic circuit 34 embodied as a field programmable gate array (FPGA). One of ordinary skill in the art will recognize that the logic circuit 34 may be embodied in forms other than a FPGA. The details of relevant portions of the exemplary logic circuit 34 will be described in further detail below. The exemplary mobile unit 22 also comprises optional command and data ports 36 and 38. These data ports 36 and 38 are or may be conventional and will not be described in further detail.

The mobile unit 22 further comprises a transmit circuit 40 and a receive circuit 42. The transmit and receive circuits 40 and 42 are coupled to an antenna 44 through transmit and receive filter circuits 46 and 48. The antenna 44 and filter circuits 46 and 48 are conventional and will not be described herein in further detail.

FIG. 3 also shows that the transmit and receive circuits 40 and 42 each comprise a baseband processor 50, an IF modulator 52, and an RF stage 54. The suffix (a) is associated with components of the transmit circuit 40, while the suffix (b) is associated with similar components of the received circuit 42. The baseband processors 50, IF modulators 52, and RF stages 54 all are or may be conventional and will be described below only to the extent necessary for a complete understanding of the present invention.

The mobile unit 22 employs two separate clock signals having slightly different frequencies to obtain distance calculations as will be described in further detail below. Because two clock signals are used, the transmit and receive circuits 40 and 42 use separate baseband processors 50a and 50b, respectively.

The baseband processors 50a,b, IF modulators 52a,b, and RF stages 54a,b are or may be conventional and will not be described herein in detail. Similar circuits are described in U.S. Pat. No. 6,067,039 to Pyner, and the disclosure of that patent is incorporated herein by reference.

IV. Fixed Unit

Figure 4:
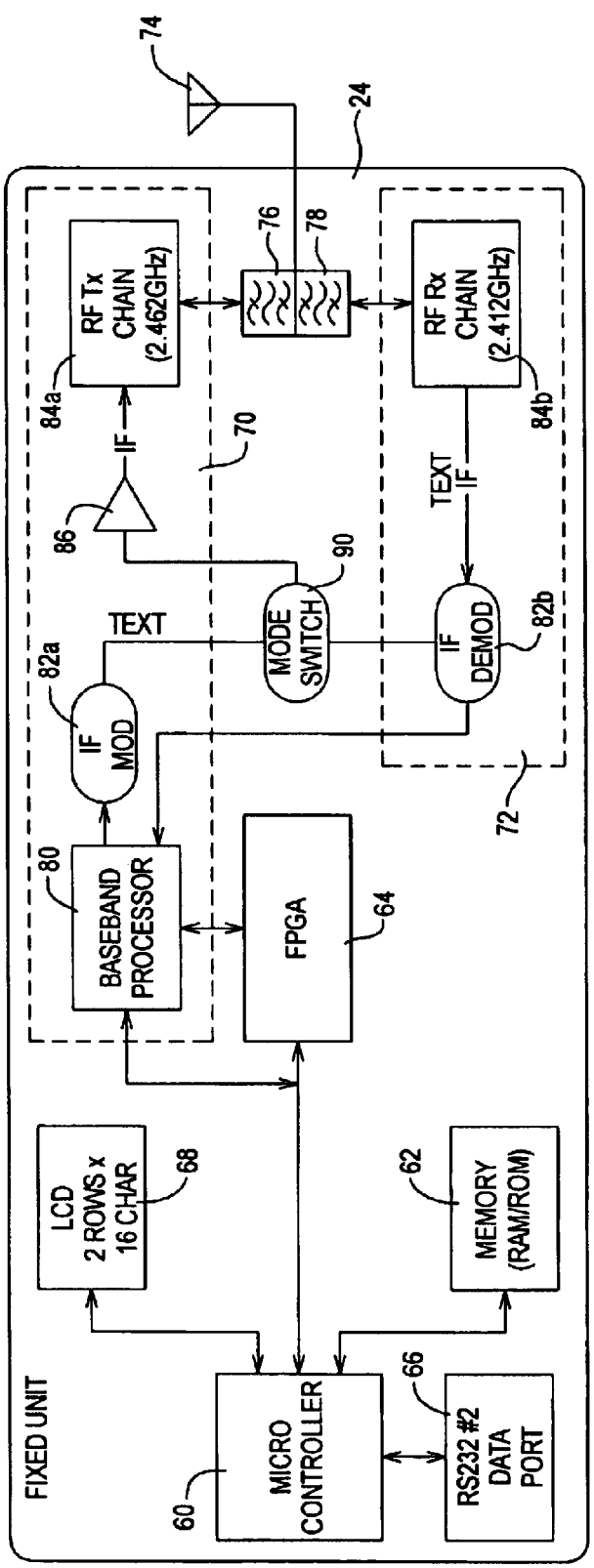
FIG. 4 is a high level block diagram depicting the overall structure of a fixed unit used by the positioning system of FIG. 1.

Referring now to FIG. 4, depicted therein is a simplified block diagram of one of the fixed units 24. For manufacturing and maintenance purposes, the fixed units 24 will be identical, but it is possible to implement the invention with fixed units having different software and/or circuit topologies.

The fixed units 24 are similar in many respects to the mobile unit 22. In particular, the fixed units 24 comprise a controller 60, memory 62, and a logic circuit 64 implemented as an FPGA that may be identical to the FPGA containing the logic circuit 34. Again, the use of a common FPGA to implement both of the logic circuits 34 and 64 creates manufacturing and maintenance efficiencies but is not required to implement the principles of the present invention in its broadest form. The fixed units 24 further optionally comprise a conventional data port 66 and a conventional LCD display 68.

The fixed unit 24 further comprise a transmit circuit 70 and a receive circuit 72. These transmit and receive circuits 70 and 72 are coupled to a conventional antenna 74 by conventional filters 76 and 78.

The transmit circuit 70 comprises a baseband processor 80, an IF modulator 82a, and an RF stage 84a. In the exemplary system 20, the receive circuit 72 comprises only an IF demodulator 82b and an RF stage 84b and does not employ a separate baseband processor. Unlike the mobile unit 22, the fixed units 24 do not require two different clock signals with slightly different frequencies to obtain distance calculations. Because only one clock signal is required, the baseband processor 80 may be used for both transmit and receive functions.

The fixed unit 24 further comprises a mode switch 90 that allows the fixed unit 24 to be placed in either a data mode or in a loopback mode. In particular, when the fixed unit 24 is in the data mode, the input to the RF stage 84a is the IF modulator 82a of the transmit circuit 70. When the fixed unit 24 is in the loopback mode, the input to the RF stage 84a is the IF demodulator 82b of the receive circuit 72.

When the fixed unit 24 is in the data mode, the fixed unit 24 may receive and process data packets such as the Response to Initialize data packet 26b described above. When the fixed unit 24 is used to obtain distance information in the loopback mode, the fixed unit 24 functions as an RF repeater that simply retransmits RF signals received by the received circuit 72. Typically, the RF signals will carry data packets such as the Measurement packets 26c–f described above.

However, when operating in the loopback mode, the fixed units 24 may also use the baseband processor 80 to decode the data packet as the packet is being retransmitted. Other types of data may thus be transferred from the mobile unit 22 to the fixed unit 24 while the measurement calculations are performed.

In loopback mode, the fixed units 24 thus operate as simple repeaters that retransmit the received measurement packets 26c–f without any baseband processing at the fixed units 24. No distance measurements need be taken at the fixed units 24, and any delays in retransmitting the measurement packets 26c–f are relatively small and constant.

The baseband processor 80, IF modulators 82a,b, RF stages 84a,b, and mode switch 90 also are may be conventional and will not be described herein in detail.

V. Controllers

The controllers 30 and 60 and memory 32 and 62 are or may be conventional and will not be described herein in detail. The controllers 30 and 60 may be any microprocessor capable of receiving data from and controlling the logic circuits 34, 64 and the transmit and receive circuits 40, 42, 70, and 72 as described herein. In the exemplary system 20, the controller 30 is also capable of performing the distance and location calculations recited herein. The memory devices 32 and 62 allow permanent and temporary storage of instructions and data as necessary to perform the control and calculation functions of the controllers 30 and 60.

VI. Logic Circuits

The logic circuits 34 and 64 implemented by the FPGAs will now be described in further detail with reference to FIGS. 5–8.

Figure 5:
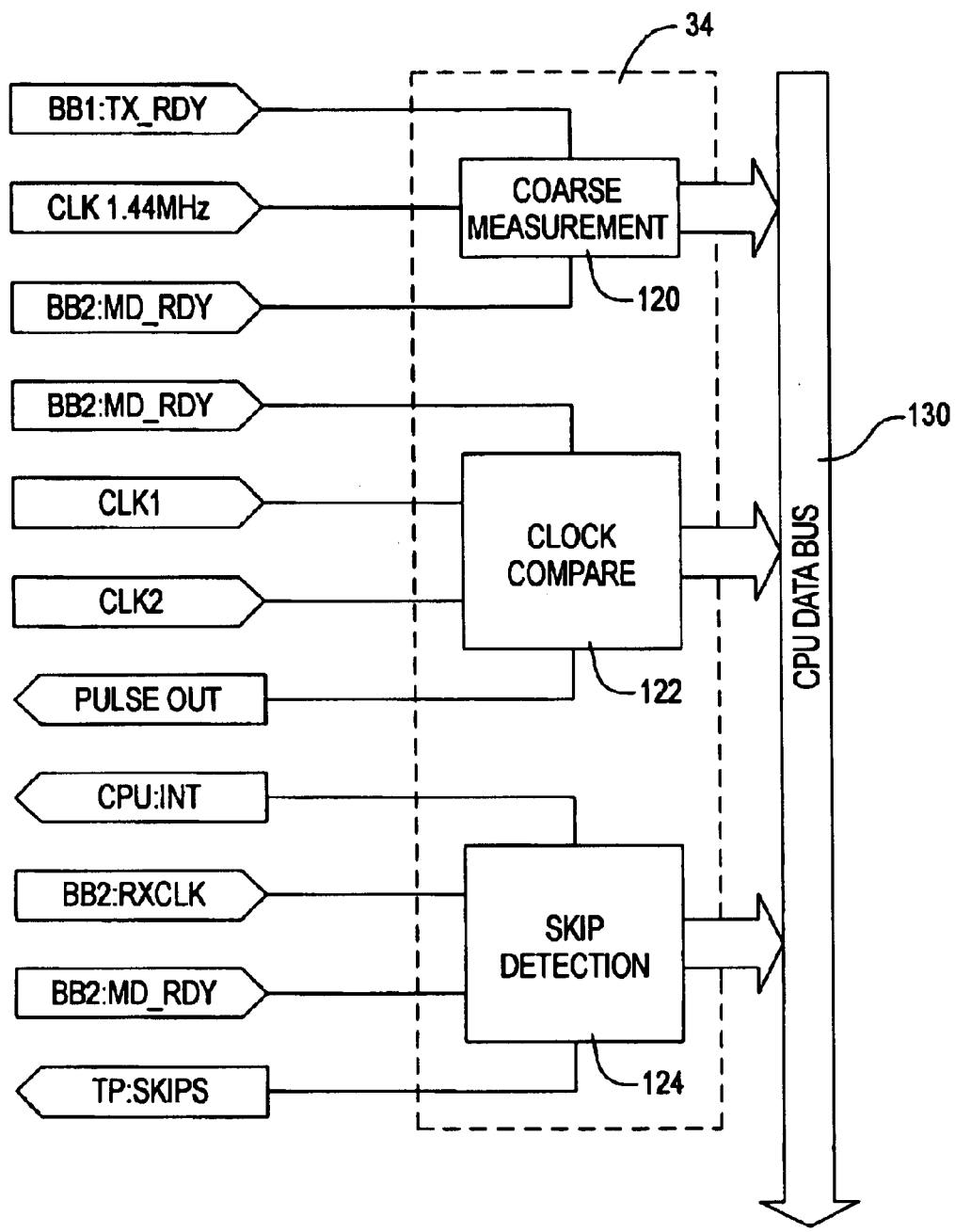
FIG. 5 is a block diagram of the field programmable gate array used as part of the mobile and fixed units depicted in FIGS. 3 and 4.

Referring initially to FIG. 5, it can be seen that the exemplary logic circuit 34 comprises a coarse measurement circuit 120, a clock compare circuit 122, and a skip detection circuit 124. The FPGA used to implement the logic circuits 34 and 64 also contains a timer circuit, transmit and receive first-in/first-out (FIFO) circuits, and I/O port circuits. These additional circuits are or may be conventional and will not be described herein in detail. In addition, these additional circuits are not required for the distance calculations described herein and may be omitted in other embodiments of the present invention.

The coarse measurement, clock compare, and skip detection circuits 120–124 are all connected to a data bus 130 that is in turn connected to the controller 30. The data bus 130 is or may be conventional and will not be described herein in detail.

FIG. 5 also shows that each of these circuits 120–124 receives and/or generates one or more discrete signals as shown in FIG. 5 and as will be described in further detail below. Other signals are also received and/or generated by the logic circuit 34 in general and the circuits 120–124 in particular, but these other signals may be characterized as housekeeping signals and are not essential to an understanding of the present invention.

In the exemplary system 20, the coarse measurement circuit 120, clock compare circuit 122, and skip detection circuit 124 generate numerical values that the controller 30 uses, as will be described in further detail below, to measure distance and/or position using the principles of the present invention.

The logic circuit thus operates basically as follows. The coarse measurement circuit 120 generates a coarse measurement value. The transmit and receive circuits 40 and 42 of the fixed unit 22 use separate transmit and receive master clock signals CLK1 and CLK2, both of which are located at the mobile unit 22. The clock compare circuit 122 directly measures the phase difference between these two clock signals CLK1 and CLK2. The skip detection circuit 124 calculates the frequency difference between the two clock signals CLK1 and CLK2. The coarse measurement value is refined using the phase and frequency difference information to obtain a more accurate measurement of distance.

As described in U.S. Pat. No. 6,067,039 cited above, the accuracy of the distance value calculated by the coarse measurement circuit 122 depends upon the frequencies of the clock signals used by the baseband processors 50a,b. In the present system 20, the exemplary coarse measurement circuit 120 is accurate only to within plus or minus eleven feet (44 MHz); in many environments, a higher level of accuracy is required.

Accordingly, as described below, the controller 30 uses the numerical values generated by the clock compare circuit 122 and skip detection circuit 124 to increase the accuracy of the distance measurements generated by the system 20. The clock compare circuit 122 and skip detection circuit 124 allow the system 20 to obtain distance measurements accurate to within plus or minus 20 centimeters without increasing the frequency of the baseband processor clock. In practice, it might be possible to improve the accuracy of the system 20 even more by taking multiple measurements and averaging and/or using a greater number of fixed units 24.

The coarse measurement circuit 120, clock compare circuit 122, and skip detection circuit 124 will each be discussed separately below.

A. Coarse Measurement Circuit

Figure 6:
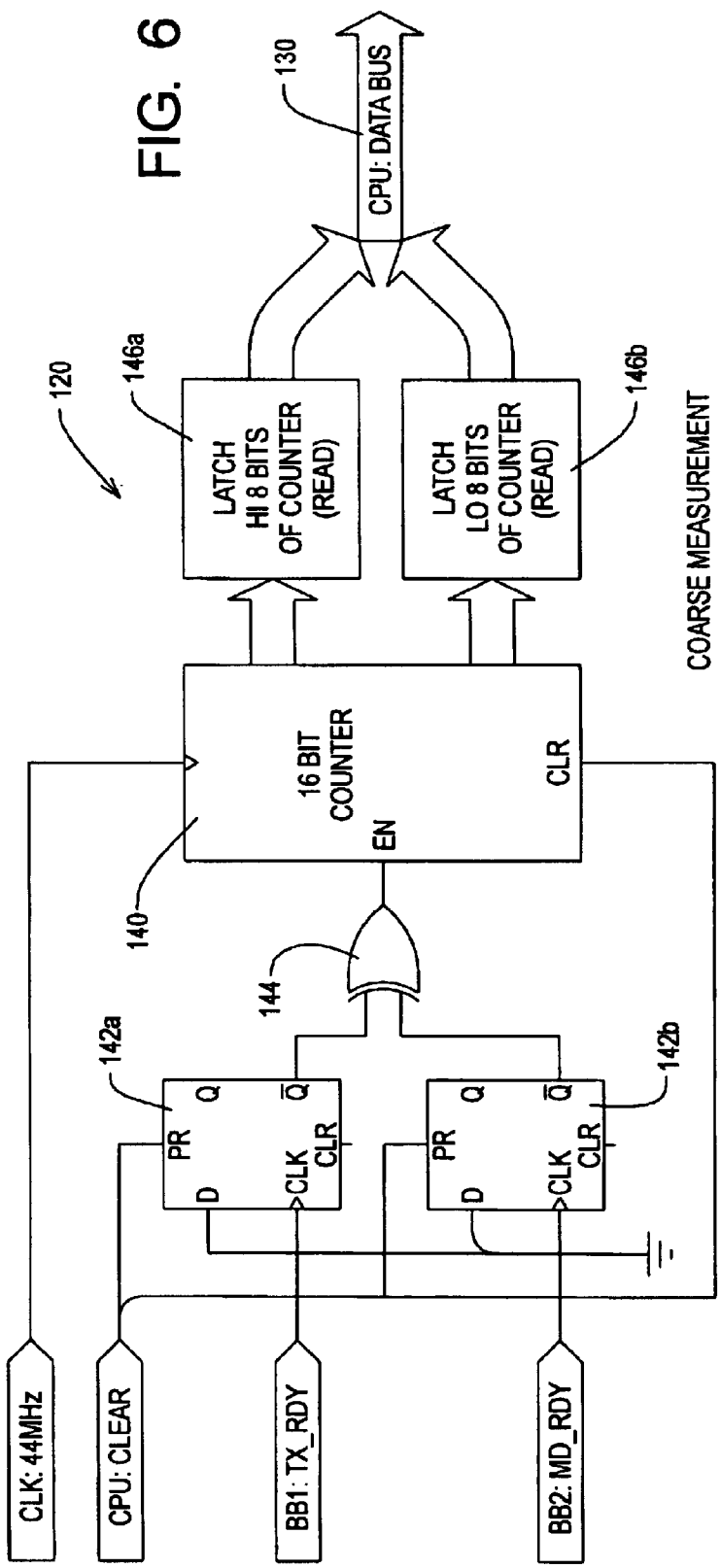
FIG. 6 is a block diagram of a coarse measurement circuit used by the positioning system of FIG. 1.

Referring now to FIG. 6, depicted therein in further detail is the coarse measurement circuit 120. The coarse measurement circuit 120 measures the period of time it takes for a data packet 26 to make the round trip between the mobile unit 22 and the fixed units 24. This process is similar to the coarse measurement process used in U.S. Pat. No. 6,067,039 cited above. Circuits other than the circuit 120 described herein or the similar circuit described in the '039 patent may be used to perform this function. The scope of the present invention should thus not be limited to the particular implementation of the circuit 120 described herein.

The coarse measurement circuit 120 measures the time it takes a data packet 26 generated at the mobile unit 22 to propagate to a selected one of the fixed units 24, be retransmitted by the selected fixed unit 24 in the loopback mode, and then propagate back to the mobile unit 22.

More specifically, the baseband processor 50a of the mobile unit transmit circuit 40 generates a signal TX_RDY when the first data bit is transmitted. The receive baseband processor 50b generates a signal MD_RDY that goes high when the first data bit retransmitted by the fixed unit 24 is received by the mobile unit 22. These TX_RDY and MD_RDY signals are input to a counter 140 through flip-flops 142a and 142b and then through an XOR gate 144.

The flip-flops 142a,b and XOR gate 144 result in a HIGH signal being generated at the ENABLE input of the counter 140 that generally corresponds to the round trip transit time of the measurement packets 26c–f as generally described above. A 44 MHz clock signal is applied to the CLK input of the counter 140. The counter 140 counts the number of CLK pulses that occur when the ENABLE input is held HIGH. The value of the counter 140 is applied to latches 146a,b. These latches 146a,b are in turn connected to the data bus 130.

The controller 30 thus may determine the numerical value of the counter 140 by downloading the values of the latches 146a,b over the data bus 130. To obtain the coarse measurement of distance between the mobile unit 22 and any one of the fixed units 24, the controller will read the latches 146a,b at some point after the MD_RDY signal is generated, convert this numerical value into a time value based on the clock rate, and then convert this time value into a distance value using constants such as system delays and the propagation speed of electromagnetic waves. As described above, the distance value so obtained corresponds to the distance between the mobile unit 22 and any one of the fixed units 24 to a level of accuracy of approximately plus or minus eleven feet.

B. Clock Compare Circuit

The clock compare circuit 122 will now be described in further detail with reference to FIG. 7. The principles of the present invention may be embodied by clock compare circuits other than the exemplary clock compare circuit 122 described used in the exemplary system 20. The exemplary clock compare circuit 122 generates a frequency difference value that the controller uses to refine the coarse measurement value obtained by the coarse measurement circuit 120.

In particular, the clock compare circuit 122 generates a numerical value corresponding to the frequency difference between the clock signals CLK1 and CLK2. The controller 30 uses the frequency difference value to determine when a given radio frequency signal was received in the previous half cycle of the receive clock CLK2. This information allows the controller 30 to refine the distance value measured by the coarse measurement circuit 120 as described above.

Figure 7:
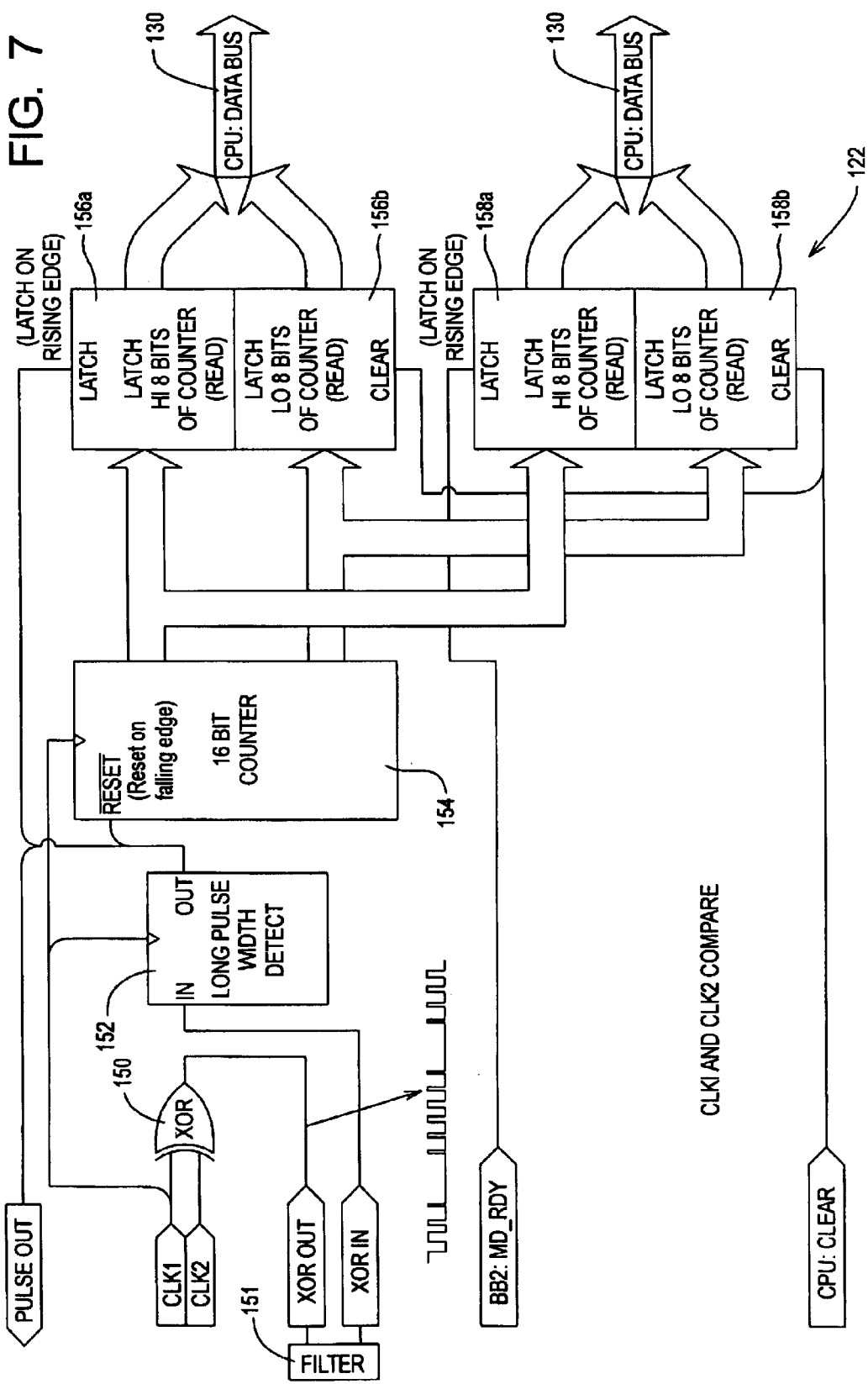
FIG. 7 is a block diagram of a clock compare circuit used by the positioning system of FIG. 1.

As shown in FIG. 7, the clock compare circuit 122 comprises an XOR gate 150, a long pulsewidth detect circuit 152, a first pair of latches 156a and 156b, and a second pair of latches 158a and 158b.

The clock compare circuit 122 operates basically as follows. The two master clock signals CLK1 and CLK2 are passed through the exclusive XOR gate 150. When the two clock signals CLK1 and CLK2 are out of phase, the output of the XOR gate 150 is high. When the clock signals CLK1 and CLK2 are in phase, the output of the exclusive XOR gate 150 is low.

The relationship between the two clock signals CLK1 and CLK2 can be such that they are neither exactly out of phase or exactly in phase. In this situation, the output of exclusive OR gate 150 may be a series of very short spikes or pulses. The output of the exclusive OR gate 150 is thus passed through a filter 151. For manufacturing considerations, the filter 151 is separate from the FPGA defining the logic circuit 34 and this arrangement is illustrated by the conventions used in FIG. 7. However, as described above, the use of an FPGA is optional and the filter may be connected to the output of the exclusive OR gate 150 using other techniques. In any event, the filter 151 eliminates the short duration pulses or spikes during the transition period when the clock signals CLK1 and CLK2 are slightly in or out of phase.

The output of the exclusive OR gate 150 is subsequently input to the long pulsewidth detect circuit 152. The clock signal CLK1 is also applied to the clock input of the counter 154. The clock signal CLK1 is also applied to the clock input of the long pulsewidth detect circuit 152. Accordingly, when the long pulsewidth detect circuit 152 determines that the output of the exclusive OR gate 150 stays high for a predetermined number of clock pulses, the counter 154 is reset and current value of the counter 154 is latched into the first pair of latches 156a,b.

The value stored by the first pair of latches 156a,b corresponds to the number of pulses of the first clock signal CLK1 in a given time period. In particular, this value corresponds to the number CLK1 pulses generated in the time between when the two clock signals CLK1 and CLK2 are in phase and when the two clock signals CLK1 and CLK2 are next in phase. The controller 30 thus uses the numerical value stored in the first pair of latches 156a,b to calculate the frequency difference between the two clock signals CLK1 and CLK2.

The second pair of latches 158a,b are also connected to the counter 154. However, the value of the counter 154 is latched into these latches 158a,b when the receive baseband processor 50b generates the MD_RDY signal upon receipt of the measurement pack 26. The numerical value stored in the second pair of latches 158a,b can thus be used in conjunction with the numerical value stored in the first set of latches 156a,b to determine the exact phase relationship between the two clock signals CLK1 and CLK2 when the measurement packet is received by the receive baseband processor 50b. Again, the latch sets 156a,b and 158a,b are connected to the data bus 130 such that the controller 30 can read these values and use them to generate distance and position values.

C. Skip Detection Circuit

Figure 8:
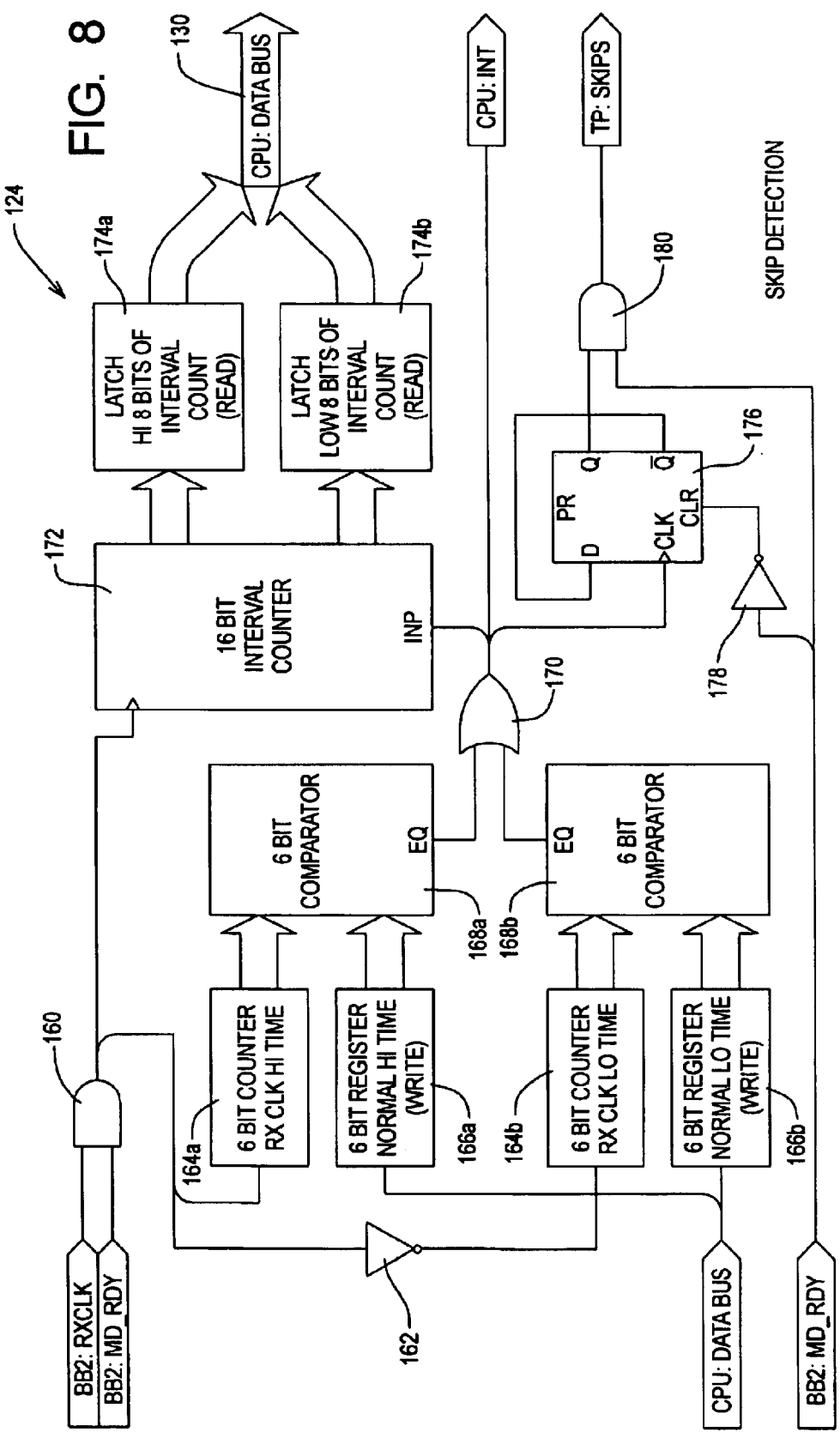
FIG. 8 is a block diagram of a skip detection circuit used by the positioning system of FIG. 1.

Referring now to FIG. 8, the exemplary skip detection circuit 124 is depicted therein in further detail. As described in the '039 patent cited above, the transmit and receive clock signals CLK1 and CLK2 located at the mobile unit 22 are purposely set to differ by approximately 25 pulses per million. This difference between the transmit and receive clock signals CLK1 and CLK2 causes the baseband processing circuits 50a,b to jump or skip to maintain synchronization with the incoming signal. This event is referred to herein as a "skip".

The receive baseband processor 50b thus generates skip signals at a frequency corresponding to the frequency difference between the frequencies of the clock signals CLK1 and CLK2. The skip detection circuit 124 detects these skip signals and generates a skip value as will be described in detail below. The exemplary skip detection circuit 124 is specifically designed to work with a given implementation of a baseband processor. Any implementation of a baseband processor as described herein will need to skip as defined herein to accommodate differing clock signals. However, the exact manner in which these skips are generated and detected may differ for different types or makes of baseband processor circuits, so the skip detection circuit would likely be implemented differently in other implementations of the present invention.

The exemplary skip detection circuit comprises an AND gate 160, an inverter 162, first and second counters 164a,b, first and second registers 166a,b, first and second comparators 168a,b, an OR gate 170, a counter 172, a pair of latches 174a,b, a flip-flop 176, a second inverter 178, and a second AND gate 180. The exemplary skip detection circuit 124 operates basically as follows.

The skip detection circuit 124 analyzes the Rx_CLK signal generated by the receive baseband processor 50b. If the transmit and receive clock signals CLK1 and CLK2 have the same frequency and are in phase, the Rx_CLK signal will always be consistent. In the exemplary positioning system 20, the Rx_CLK signal would ideally be HIGH for four master clock pulses and LOW for twelve master clock pulses, but this ideal relationship could differ from one implementation to the next.

Because the transmit and receive clock signals CLK1 and CLK2 are different, the Rx_CLK signal must occasionally skip to keep the baseband processor circuit 50b in synch. More specifically, a skip occurs when one Rx_CLK cycle is stretched or shrunk by one master clock (MCLK) pulse. For example, instead of the theoretical four MCLK high to twelve MCLK low relationship, a skip would create a five MCLK high and twelve MCLK low relationship. The skip detection circuit 124 monitors the Rx_CLK signal for the skips and generates a skip value corresponding to the time interval between the skips.

In particular, the Rx_CLK signal is gated by the MD_RDY signal through the first AND gate 160. The output of the AND gate 160 is passed directly to the first or "Hi time" counter 164a and through the first inverter 162 to the second or "Low time" counter 164b. When a single cycle of the Rx_CLK signal is completed (e.g., Hi to Low and back to Hi), the comparators 168a and 168b compare the values stored in the counters 164a and 164b with the values stored in the corresponding registers 166a and 166b. The values stored in the registers 166a and 166b correspond to the duration of one cycle of the Rx_CLK signal without skips.

When the comparators 168a and 168b determine that one of the Hi or Low values does not match the ideal value stored in the registers 166a and 166b, the controller 30 reads the value stored in one of the registers 166a or 166b over the data bus 130 as the skip value.

VII. Distance Calculations

The process of calculating the distance information based on the numerical values obtained by the coarse measurement circuit 120, clock compare circuit 122, and skip detection circuit 124 will now be described in further detail. In particular, an example of the calculation of the phase difference and fine measurement value will now be described with reference to the timing diagram in FIG. 11. For clarity, the timing diagram of FIG. 11 is not drawn to scale, but is merely intended to represent some of the concepts employed to calculate distance.

Figure 11:
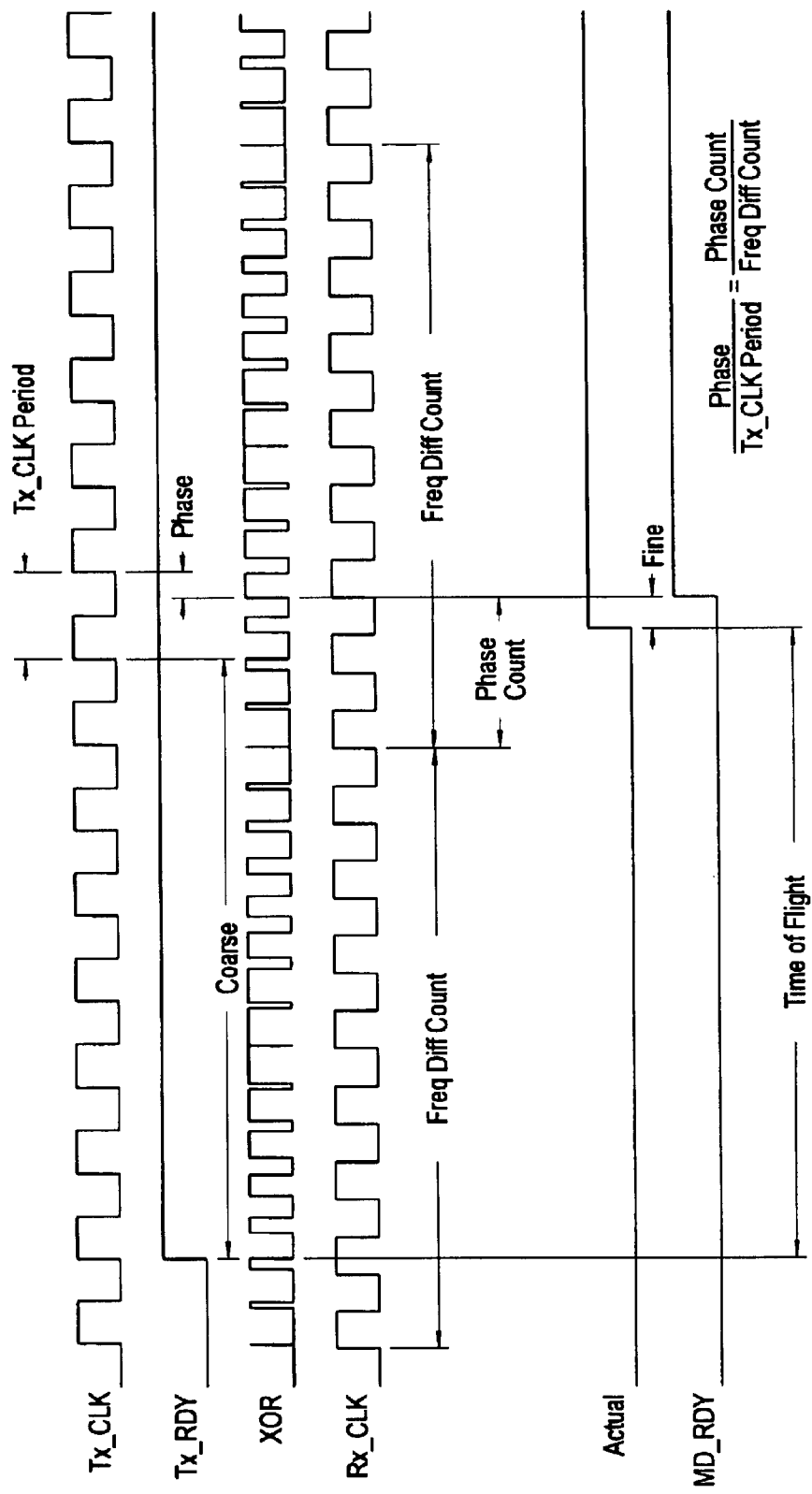
FIG. 11 is a timing diagram depicting the relationships among the various signals employed to calculate the distances between the mobile unit and one or more of the fixed units.
Figure 12:
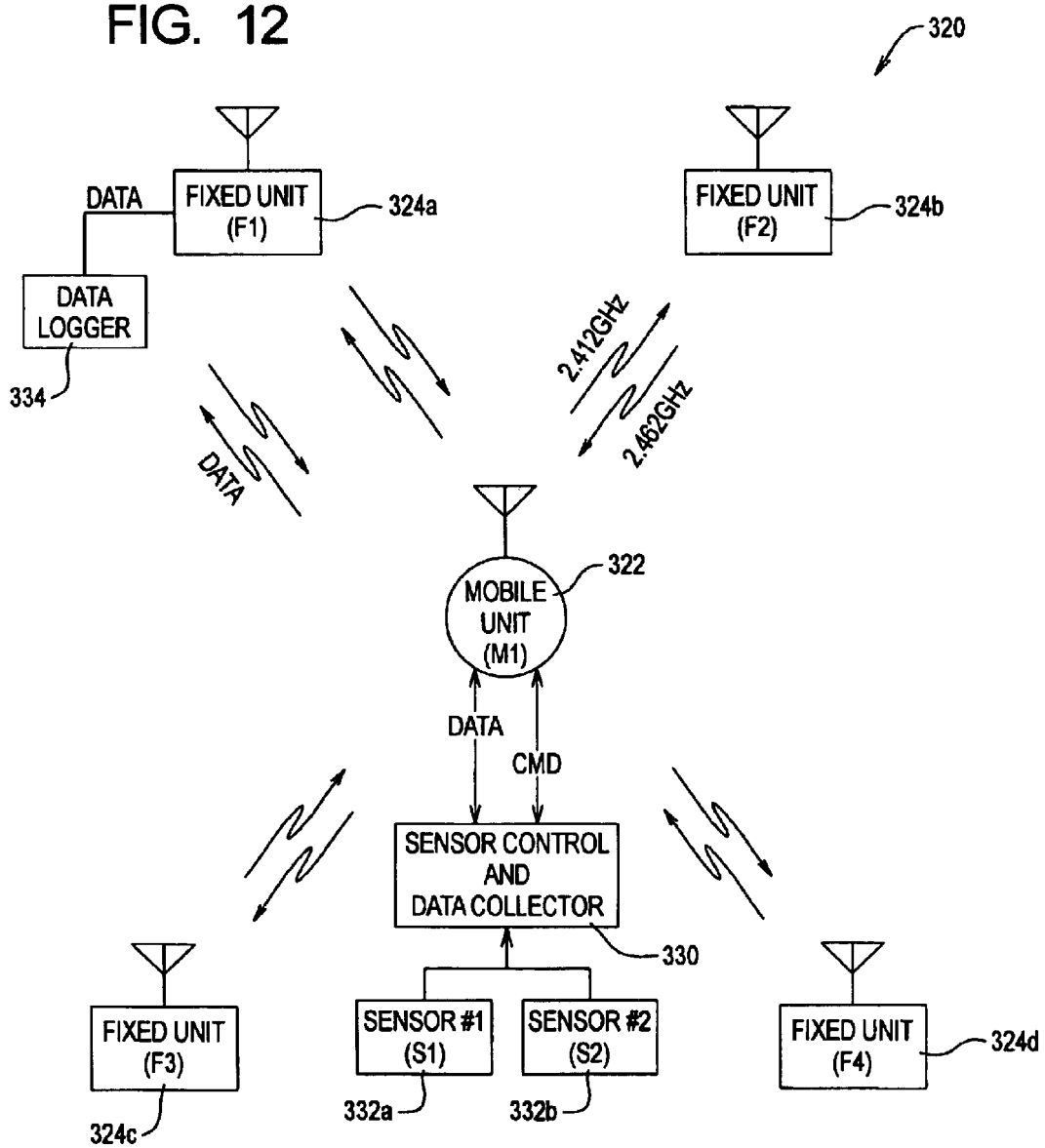
FIG. 12 is a system level block diagram similar to FIG. 1 showing the use of optional elements with the positioning system described herein.

Initially, a close analysis of FIG. 11 illustrates that the Tx_CLK and Rx_CLK signals have a slightly different frequency. FIG. 11 also shows that, while leading edge of the Tx_RDY signal may be generated to coincide, with the leading edge of one of the Tx_CLK signal pulses, the leading edge of the MD_RDY signal will likely be generated at a point in time corresponding to the leading edge of one of the Rx_CLK signals.

Because of the frequency difference between the Tx_CLK and Rx_CLK signals, the actual time of flight may differ from the generation of the MD_RDY signal as shown. In addition, the coarse measurement value is computed based on the number of Tx_CLK signals that occur between the generation of the Tx_RDY signal and the generation of the MD_RDY signal; in the example shown, the coarse measurement value corresponds to seven Tx_CLK periods. The difference between the Tx_CLK and Rx_CLK signals thus introduces an error of up to one Tx_CLK period, creating an error in the coarse measurement value as described above and in U.S. Pat. No. 6,067,039 cited above.

FIG. 11 further shows that the output of the XOR gate 150 of the clock compare circuit 122 is monitored to determine the frequency difference value (Freq Diff Count) and the phase count value (Phase Count) described above. The ratio of the phase count value to the frequency difference value corresponds to the ratio of the phase difference between the Tx_CLK and Rx_CLK signals and the period of the transmit clock signal Tx_CLK. Since the period of the transmit clock signal Tx_CLK is predetermined, the phase difference between the Tx_CLK and Rx_CLK signals may be calculated with a high degree of accuracy.

The fine measurement value is thus calculated based on the phase difference determined by the clock compare circuit 122, the phase determined by the skip detection circuit 124, and the frequency difference determined by the clock compare circuit 122. The fine measurement value may be combined with the coarse measurement value to obtain a distance value that may be converted to a time value closely corresponding to the time of flight.

A numerical example of a distance calculation is described in Exhibit A attached hereto.

VIII. Packet Processing Systems

The processors 30 and 60 of the mobile and fixed units 22 and 24 operate under the control of software programs that determines how the received packets are processed. The packet processing systems implemented in software running on each of the processors 30 and 32 will now be described in further detail.

A. Mobile Unit Packet Processing System

Figure 9:
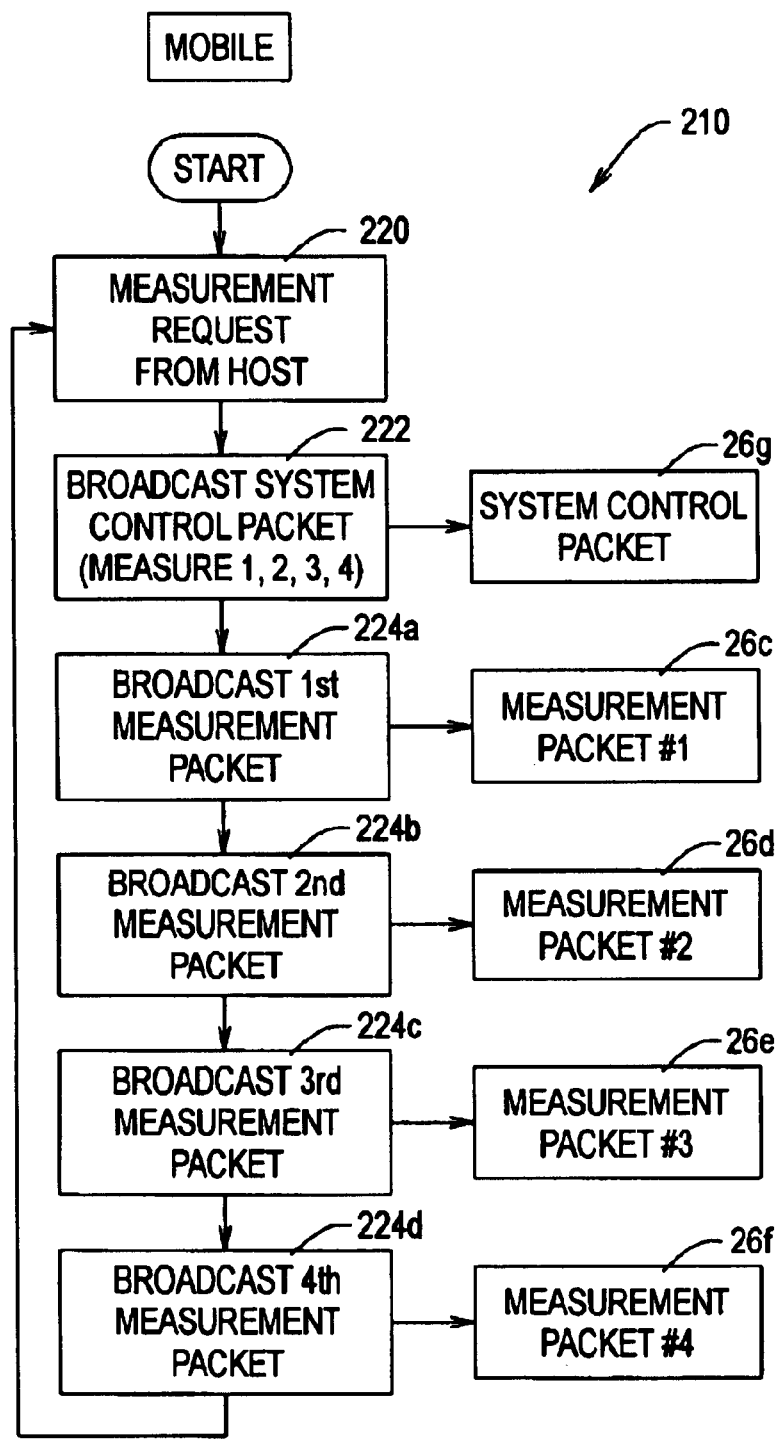
FIG. 9 is a logic flow diagram depicting the logic implemented by the mobile unit of FIG. 3.

Referring now to FIG. 9 depicted therein is a logic flow diagram illustrating a packet processing system 210 implemented by the mobile unit 22. At an initial step 220, the mobile unit 22 waits for a measurement request, which may be generated locally or received from a remote host. When the measurement request is received, the mobile unit 22 broadcasts a system control packet 26g that notifies the fixed units 24 that the mobile unit 22 will be sending measurements packets. Next, at steps 24a–d, the mobile unit 22 sends measurement packets 26c–f intended for the fixed units 24a–d, respectfully. In the exemplary system 22, the measurement packets 26c–f are sent sequentially and contain information that, as will be described in further detail below, allows the fixed units 24 to identify whether the packet is intended therefore and, if so, to retransmit the packet in loopback mode.

Accordingly, when the system 20 is making a measurement between the mobile unit 22 and a given one of the fixed units 24, the mobile unit 22 and the given fixed unit 24 are configured to receive and transmit substantially simultaneously.

B. Fixed Unit Packet Processing System

Figure 10:
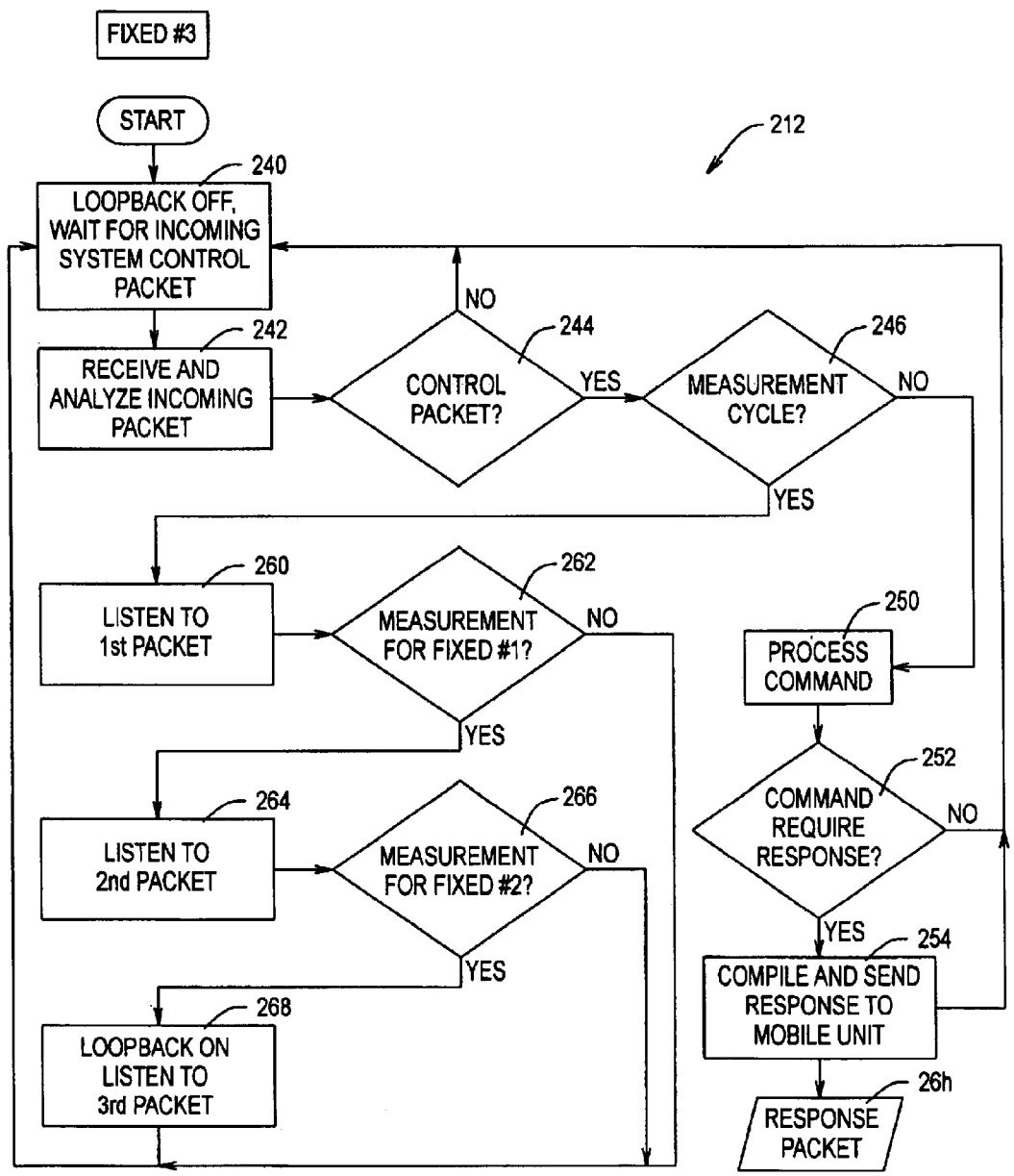
FIG. 10 is a logic flow diagram depicting the logic implemented by the fixed unit of FIG. 4.

Referring now to FIG. 10 depicted therein is a logic flow diagram illustrating a packet processing system 212 implemented by the fixed units 24.

Referring initially to step 240, the fixed units 24 are normally in a sleep mode in which they wait for an incoming system control packet. In this state, the mode switch 90 is set such that the fixed unit 24 is in its data mode rather than in its loopback mode.

Step 242 shows the receipt of an incoming packet. At this point, the type and purpose of the incoming packet are not determined, and the system 212 next moves to a step 244. At step 244, the fixed unit 24 determines whether a received packet is a control packet associated with the particular fixed unit. If not, the process returns to step 240 and waits for another packet.

If the received packet is a control packet intended for the particular fixed unit 24, the process moves to step 246. At step 246 the packet is analyzed to determine whether the measurement cycle is being initiated. If not, the control packet is assumed to include a command, and the system 212 processes the command at step 250. The system 212 further determines at step 252 whether a response is required. If not, the system 212 simply returns to step 240. If so, the system 212 moves to step 254 at which the appropriate response is compiled and sent to the mobile unit 22 in a response packet 26h. The system 212 then returns to step 240.

If, at step 246, the system 212 determines that the control packet is associated with or initiates a measurement cycle, the system 212 moves to steps 260–268. At this point, it should be noted that the packet processing system 212 described with reference to FIG. 10 may vary somewhat from one fixed unit to another. In particular, because the mobile unit 22 and fixed units 24 employ one transmit frequency and one receive frequency, the distance measurements from the mobile unit 22 to the fixed units 24 are calculated sequentially as generally shown in FIG. 9 described above. Accordingly, each fixed unit 24 must determine when it should enter the loopback mode in which the next received packet is simply retransmitted to the mobile unit 22 without being downconverted and processed.

Accordingly, the fixed units 24 are assigned an arbitrary place in the sequence illustrated in FIG. 9. In particular, the first measurement packet 26c is intended to be retransmitted by the first fixed 24a, the second measurement packet 26d is intended to be retransmitted by the second fixed unit 24b, and so on. Steps 260–268 illustrated in FIG. 10 show how the third fixed unit 24c processes measurement packets to determine when to enter the loopback mode and retransmit the third measurement packet 26e to the mobile unit 22 to allow the mobile unit 22 to calculate distance to the third fixed unit 24c.

In particular, at step 260, the third fixed unit 24c will listen to the received measurement packet and, at step 262, determine whether the received packet is the first measurement packet 26c intended for the first fixed unit 24a. If not, the system 212 returns to step 240. If the packet is the first measurement packet 26c, the system 212 moves to step 264 to listen for the next packet. If, as shown at step 266, the next packet is the second measurement packet 260d intended for the second fixed unit 24b, the system 212 is placed in its loopback mode as shown at step 268. If the received packet analyzed at step 266 is not the second measurement packet 26d, the system 212 returns to step 240.

When, at step 268, the fixed unit 24c is placed in its loopback mode and the next measurement packet received thereby, the third measurement packet 26e will simply be retransmitted directly through the RF circuitry. Optionally, the measurement packet 263 may be converted to the baseband frequency and processed to extract data therefrom as generally discussed above.

As generally described above, this substantially simultaneous retransmission of the third measurement packet 26e eliminates a number of variables that may affect the accuracy of the overall system 20. For example, in the system described in U.S. Pat. No. 6,067,039 cited above, the packet would be received and retransmitted a predetermined time period thereafter. This predetermined time period introduced error due to clock drift and the like. The primary delay in the system 20 is introduced by the demodulator 82b, loopback switch 90, and modulator 86, and this delay may be considered zero for the purposes of calculating distancing information.

The packet processing system 212 implemented by the first fixed unit 24a enters the loopback mode as soon as the system 212 determines at step 246 that the received packet is initiating the measurement cycle. The second fixed unit 24b would enter the loopback mode after it was determined at step 262 that the packet detected at 260 is intended for the first fixed unit 24a. The fourth and any subsequent fixed units would also monitor the measurement packets to determine whether the packet is intended for the fixed unit immediately prior in the arbitrary numbering of the fixed units 24.

The system described above with reference to FIG. 10 may be modified somewhat in different implementations of the present invention. For example, rather than analyzing each data packet, each fixed unit 24 may enter the loopback mode a predetermined time period after it is determined at step 246 that the system is entering the measurement cycle. The predetermined delay would differ for each of fixed units 24 and would be calculated to place each of the fixed units 24 in the loopback mode at the appropriate time.

IX. Data Collection System

Referring now to FIG. 11, depicted therein is a data collection system 320 constructed in accordance with, and embodying the principles of the present invention. The data collection system 320 comprises a mobile unit 322 and a plurality of fixed units 324 that may be constructed in the same manner as the mobile unit 22 and fixed units 24 described above. In addition, the data collection system 320 comprises a sensor control and data collector module 330 and a plurality of sensors 332. The sensor control and data collector 330 and sensors 332 are adjacent or attached to the mobile unit 322. The exemplary data collection system 320 further comprises a data logger 334 located, for example, at the fixed unit 324a.

The sensors 332 may be any sensing device capable of generating an electrical signal based on an environmental factor. Such sensors may detect the presence or absence of substances, electromagnetic radiation, or the like. The electrical signals generated by the sensors 332 are processed by the sensor control and data collector module 330 and organized into data packets that may be transmitted by the mobile unit 322.

In the system 320, these data packets are transmitted to the fixed unit 324 where the data may be logged and/or processed by the data logger 334. As the data detected by the sensors 332 is logged and/or processed, the mobile unit 322 may continually determine its position and send this position information also to the fixed unit 324*a*. The data detected by the sensors 332 is combined with the position data determined by the mobile unit 322 using a positioning system such as the positioning system of the present invention described above.

One of ordinary skill in the art will recognize that the distancing, positioning, and data recording systems of the present invention may be applied in a number of environments. The scope of the present invention should thus not be limited to the specific exemplary embodiments described herein.

We claim:

1. A distancing system for determining a distance between first and second locations, comprising:

at least one mobile unit arranged at the first location, the mobile unit comprising a first receive portion operating at a first frequency, a first transmit portion operating at a second frequency, a first baseband processor coupled to the first receive portion, where the first baseband processor operates based on a first clock signal, a second baseband processor coupled to the first transmit portion, where the second baseband processor operates based on a second clock signal, and a first control portion coupled to the first and second baseband processors; and at least one fixed unit arranged at the second location, the fixed unit comprising a second receive portion operating at the second frequency, a second transmit portion operating at the first frequency, a third baseband processor coupled to the second receive portion, where the third baseband processor operates based on a third clock signal, a second control portion coupled to the third baseband processor, and a mode switch circuit that operates in a first mode in which an output of the second receive portion is coupled to an input of the second transmit portion, and a second mode in which the output of the second receive portion is coupled to an input of the third baseband processor; whereby the mode switch circuit is placed in the first mode to allow communication between the fixed and mobile units; and the mode switch circuit is placed in the second mode to determine the distance between first and second locations.

\* \* \* \* \*